United States Patent [19]
Chang

[11] Patent Number: 5,947,572
[45] Date of Patent: Sep. 7, 1999

[54] HARD DISK DRIVE DRAWER

[76] Inventor: Cheng-Chun Chang, 2F-2, No. 9, Lane 236, Sec. 5, LoSzuFu Road, Taipei City, Taiwan

[21] Appl. No.: 09/157,009

[22] Filed: Sep. 18, 1998

[51] Int. Cl.⁶ .................................................... A47B 95/02
[52] U.S. Cl. ........................................ 312/332.1; 439/484
[58] Field of Search ............................. 312/332.1, 223.1, 312/223.2; 439/484

[56] References Cited

U.S. PATENT DOCUMENTS

| | | | |
|---|---|---|---|
| 2,514,246 | 7/1950 | Knox | 312/332.1 X |
| 2,944,864 | 7/1960 | Krivulka | 312/332.1 |
| 3,279,875 | 10/1966 | De Witte, Jr. | 312/332.1 |
| 5,557,499 | 9/1996 | Reiter et al. | 361/685 |
| 5,563,767 | 10/1996 | Chen | 361/685 |
| 5,694,290 | 12/1997 | Chang | 361/685 |
| 5,765,933 | 6/1998 | Paul et al. | 439/157 X |
| 5,828,548 | 10/1998 | Chen | 312/332.1 X |

FOREIGN PATENT DOCUMENTS

| | | | |
|---|---|---|---|
| 1282756 | 11/1968 | Germany | 439/372 |
| 6406739 | 12/1964 | Netherlands | 439/372 |

*Primary Examiner*—Peter M. Cuomo
*Assistant Examiner*—David E. Allred
*Attorney, Agent, or Firm*—Dougherty & Troxell

[57] ABSTRACT

A hard disk drive (HDD) drawer includes an outer casing fixed inside a computer and an inner casing which receives an HDD therein. The outer casing has two opposite side walls defining an open front end for removably receiving the inner casing therein. Each of the side walls has a guide slot extending from the front opening to an inner end and a second slot extending from the inner end of the guide slot to a top side of the outer casing in a direction substantially normal to the guide slot. The second slot has two opposite walls. The inner casing has a handle having two side limbs pivoted thereto to allow the handle to be rotatable between an insertion position and a securing position. The handle limbs are slidably receivable in the guide slots of the outer casing for inserting the inner casing into the outer casing. The handle limbs and the guide slots and the second slots are configured and dimensioned so that when the handle is rotated between the insertion position and the securing position, an inner end of the limbs is brought into contact engagement with one of the walls of the second slots for serving as a fulcrum point in a lever system wherein the pivot of the handle serves as the reaction point and the handle which is held by a computer user is the force application point. With such a lever system, the insertion and withdrawal of the inner casing is enhanced.

3 Claims, 5 Drawing Sheets

HARD DISK DRIVE DRAWER

FIELD OF THE INVENTION

The present invention relates generally to a computer hard disk drive (HDD) and in particular to a hard disk drive drawer comprising a fixed casing fixed inside the computer casing and a removable casing removably receivable in the fixed casing, the HDD being fixed inside the removable casing. More particularly, the present invention is related to the handle structure of the removable casing of the HDD drawer for facilitating insertion and withdrawal of the removable casing into/out of the fixed casing.

BACKGROUND OF THE INVENTION

Most personal computers are equipped with a hard disk drive (HDD) for mass data storage. Originally, the HDD is designed to fix inside the computer casing and is thus not readily removable out of the computer so that the replacement and/or maintenance of the HDD is difficult and cumbersome. To provide an easier way to maintain and replace the HDD, there are the so-called HDD drawers available in the market. The HDD drawer comprises a fixed outer casing that is fixed inside the computer casing and a removable inner casing which is removably fit into the outer casing. The HDD is fixed in the inner casing so that it is readily accessible by simply removing the inner casing from the outer casing. Two mated electrical connectors are respectively provided on the outer casing and inner casing to establish electrical connection therebetween which connects the HDD to the computer. Examples of the HDD drawer are Taiwan patent publication Nos. 193440, 251710, and 264165.

In conventional designs, to properly mount the inner casing into the outer casing, one has to first insert the inner casing into the outer casing to such a position where the connectors thereof are brought into contact with each other. To have the two connectors electrically engage each other, one has to forcibly push the inner casing further into the outer casing to drive the connectors into engagement with each other so as to establish proper and secure electrical connection therebetween. This may sometimes cause problems. A very important factor to be taken into consideration in engaging the two connectors is that the two connectors have to be in exact alignment with each other so that when the inner casing is forcibly pushed further into the outer casing, the connectors may properly engage each other. An imperfect alignment which is usually caused by manufacturing tolerance or undesired deformation of the casings or improper insertion of the inner casing into the outer casing may cause physical damage to the connectors.

Thus, it is desirable to provide a computer hard disk drive drawer which comprises a mechanism to provide a lever action in forcing the connectors to engage each other so that the process of engaging the connectors may be better controlled and damage to the connectors avoided.

SUMMARY OF THE INVENTION

Therefor, an object of the present invention is to provide a hard disk drive drawer in which a lever system is incorporated for the provision of better control in engaging the connectors of the inner and outer casings so that damage to the connectors caused by improper engagement may be effectively alleviated or even eliminated.

In accordance with the present invention, there is provided a hard disk drive (HDD) drawer comprising an outer casing fixed inside a computer and an inner casing which receives an HDD therein. The outer casing has two opposite side walls defining an open front end for removably receiving the inner casing therein. Each of the side walls has a guide slot extending from the front opening to an inner end and a second slot extending from the inner end of the guide slot to a top side of the outer casing in a direction substantially normal to the guide slot. The second slot has two opposite walls. The inner casing has a handle having two side limbs pivoted thereto to allow the handle to be rotatable between an insertion position and a securing position. The handle limbs are slidably receivable in the guide slots of the outer casing for inserting the inner casing into the outer casing. The handle limbs and the guide slots and the second slots are configured and dimensioned so that when the handle is rotated between the insertion position and the securing position, an inner end of the limbs is brought into contact engagement with one of the walls of the second slots for serving as a fulcrum point in a lever system wherein the pivot of the handle serves as the reaction point and the handle which is held by a computer user is the force application point. With such a lever system, the insertion and withdrawal of the inner casing is enhanced.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
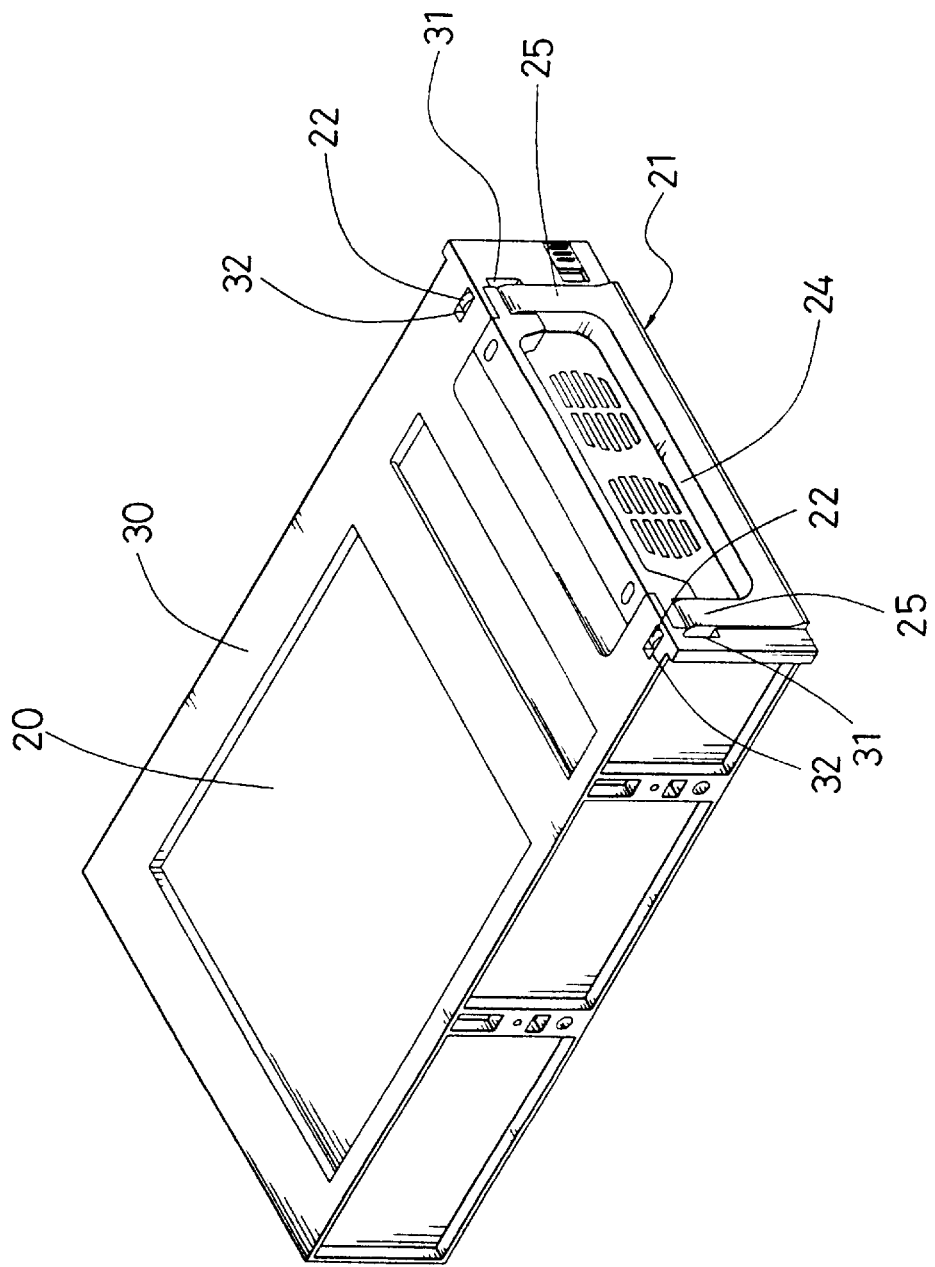
FIG. 1 is a perspective view showing a hard disk driver drawer constructed in accordance with the present invention with the inner casing completely received in the outer casing.
Figure 2:
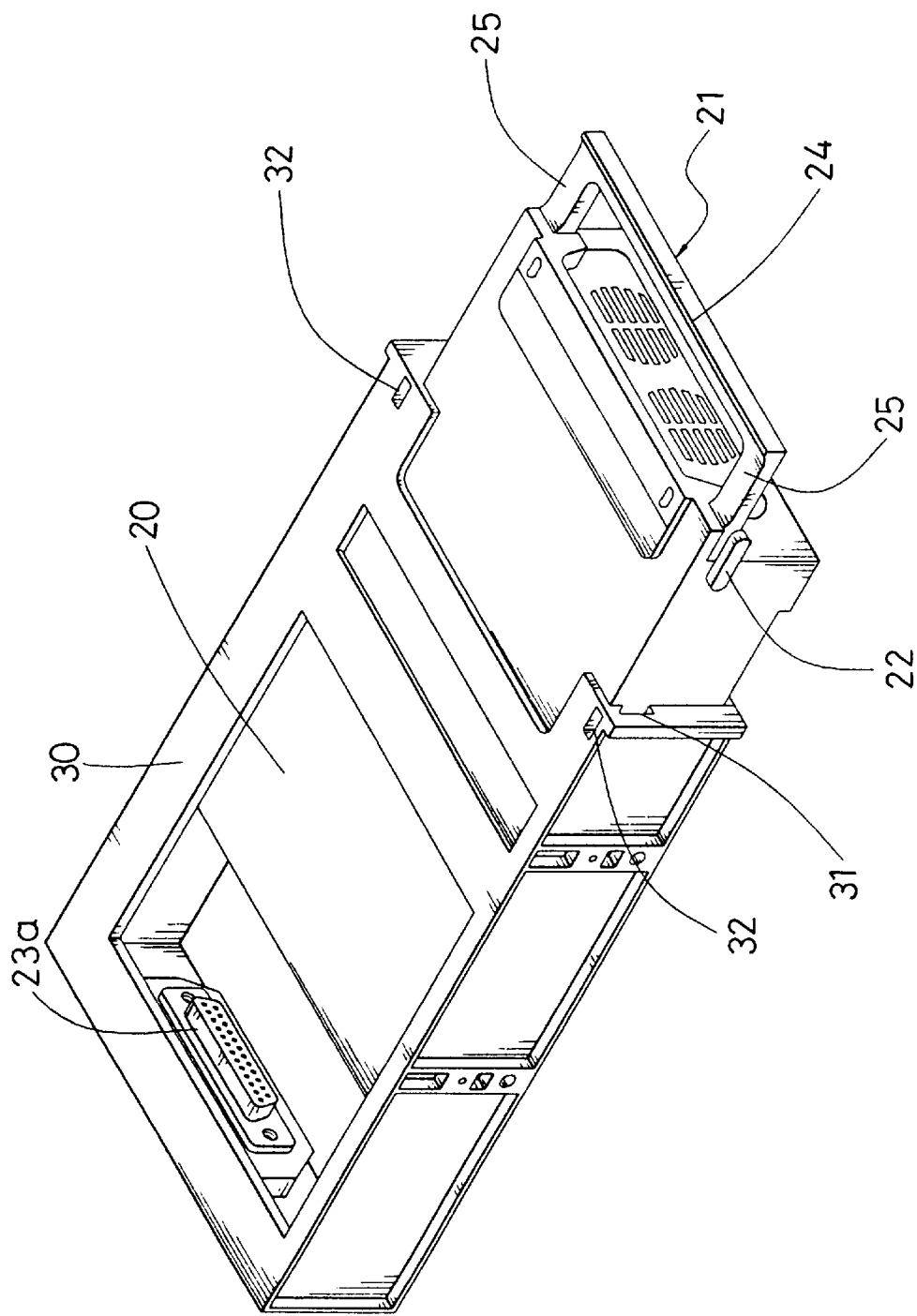
FIG. 2 is also a perspective view of the hard disk driver drawer of the present invention with the inner casing partially withdrawn out of the outer casing.

With reference to the drawings and in particular to FIGS. 1 and 2, wherein a hard disk drive (HDD) drawer constructed in accordance with the present invention is shown, the HDD drawer of the present invention comprises an inner casing 20 for receiving and securing therein a hard disk drive (not shown) and an outer casing 30 which is to be fixed inside a computer casing (not shown) for removably receivable therein the inner casing 20. The outer casing 30 is in general in the form of a box having an open front end for the entry of the inner casing 20. A first connector 23a is provided on the outer casing 30, preferably on a rear side wall of the outer casing 30, and in connection with the computer circuit (not shown) and a mated second connector 23b (see FIGS. 3–5) that is in electrical connection with the HDD is provided on the inner casing 20 and is positioned and configured to be engageable with the first connector 23a of the outer casing 30 when the inner casing 20 is received into the outer casing 30. This establishes an electrical connection between the HDD and the computer circuit.

Figure 3:
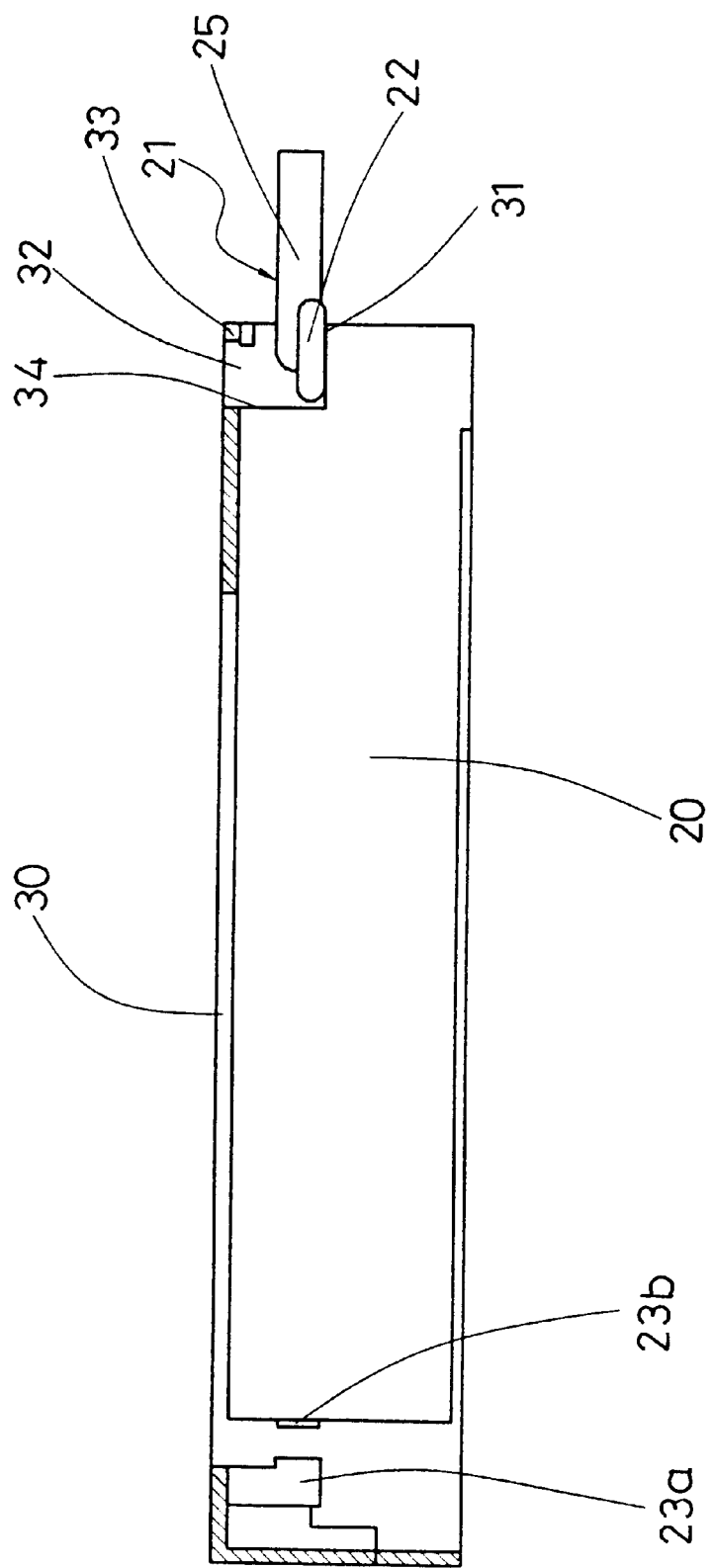
FIGS. 3–5 are side elevational views, partially sectioned, showing the insertion of the inner casing into the outer casing in sequence.
Figure 5:
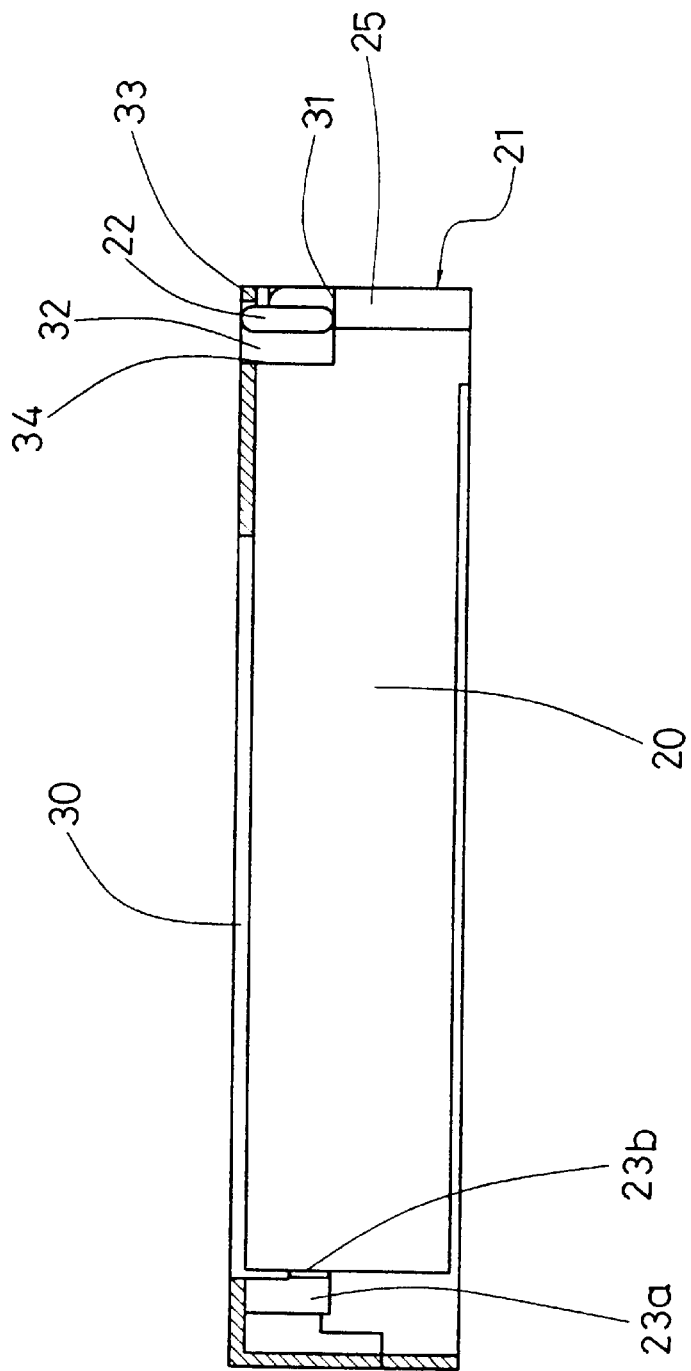

In accordance with the present invention, the inner casing 20 is provided with a handle 21, preferably in the form of a U shape, having an elongated handle body 24 with two side limbs 25 pivoted to the front side of the inner casing 20 so as to allow the handle 21 to be rotatable with respect to the front side of the inner casing 20 between an insertion position where the handle side limbs 25 are substantially parallel with the front-rear direction of the outer casing 30 as shown in FIGS. 2 and 3 and a secured position where the side limbs 25 are substantially normal to the front-rear direction as shown in FIGS. 1 and 5. Each of the side limbs 25 has an elongated sideways projections 22 which is substantially parallel with and fixed to the side limb 25. Preferably, the sideways projection 22 is integrally formed with the side limb 25 so that the sideways projection 22 serves as an extension of the side limb 25.

Figure 4:
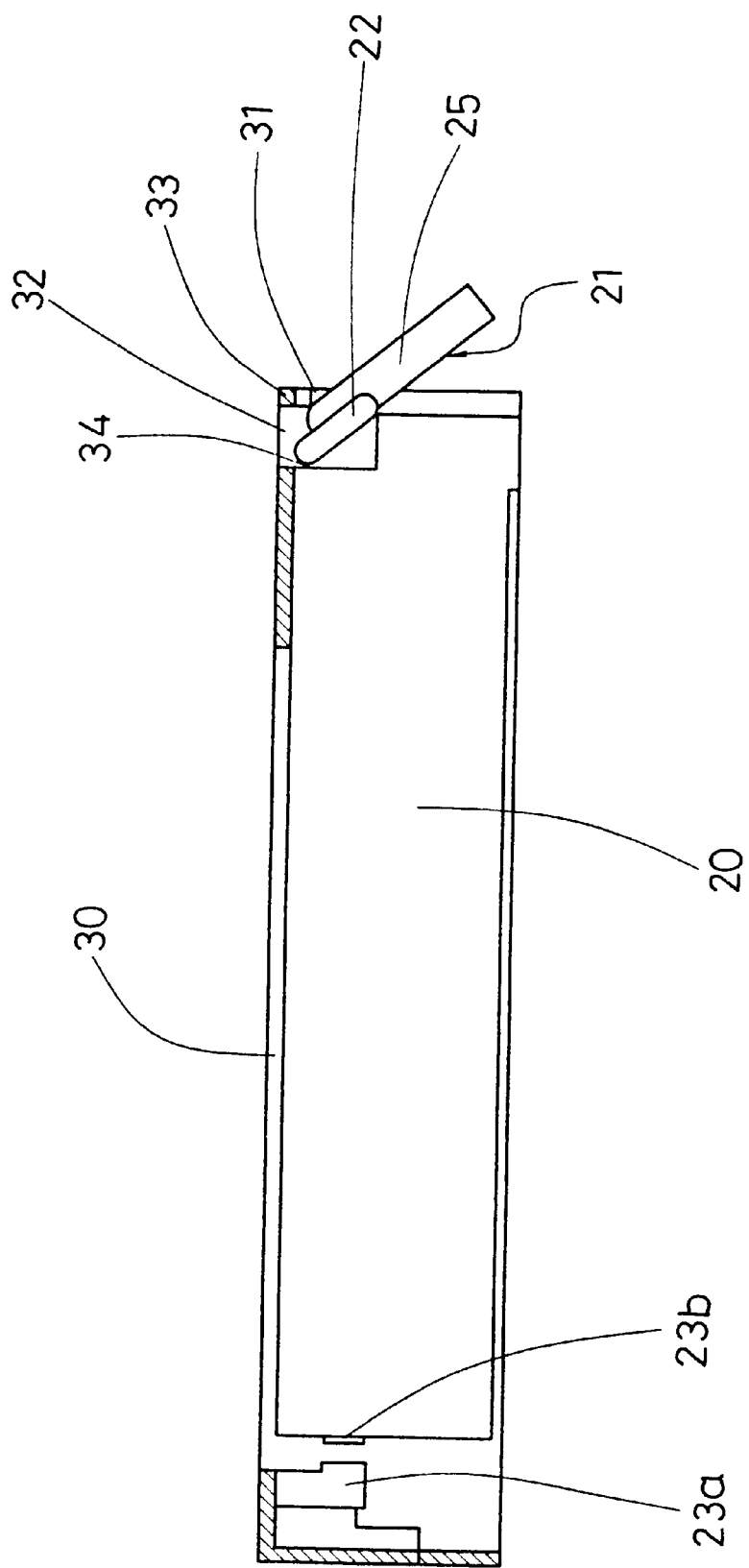

The front opening of the outer casing 30 has two side walls respectively associated with the two handle side limbs 25, each having a guide slot 31 formed on an inside surface thereof and extending in the front-rear direction for receiving the sideways projection 22 of the respective handle side limb 25 therein. The guide slot 31 is sized to allow sliding movement of the respective sideways projection 22 with respect thereto when the handle 21 is at the insertion position for the entry of the inner casing 20 into the outer casing 30, as shown in FIGS. 3–5.

The dimension of the guide slot 31 of the outer casing 30 in the front-rear direction and that of the sideways projections 22 of the inner casing 20 in the direction of the side limb 25 are such that the inner casing 20 is allowed to be inserted into the outer casing 30 to such a position where an inner end of the sideways projection 22 is in contact engagement with an inner end wall of the guide slot 31 so that the first and second connectors 23a and 23b are located close to or in contact with each other but not engaged by each other as shown in FIG. 3.

Each of the side walls of the outer casing 30 is also provided with a second slot 32 which extends from the inner end wall of the guide slot 31 in a direction normal to the front-rear direction toward a top side of the outer casing 30. In the embodiment illustrated, the second slot 32 has an open end at the top side of the outer casing 30, but if desired, the open end of the second slot 32 may be closed so that the second slot 32 defines only a recess on the upper side of and in communication with the guide slot 31.

The second slot 32 has two inner side walls 33 and 34 opposite to each other in the front-rear direction with the first inner wall 33 in the front side and the second inner wall 34 in the rear side. The second inner wall 34 is coincident with the inner end wall of the guide slot 31 so as to constitute an extension of the inner end wall of the guide slot 31. In other words, the guide slot 31 and the second slot 32 together define an L-shaped channel in the side wall of the outer casing 30.

In inserting the inner casing 20 into the outer casing 30, the handle 21 is moved to the insertion position as shown in FIG. 3 and the inner casing 20 is positioned with respect to the outer casing 30 so as to have the sideways projections 22 of the handle side limbs 25 received into the guide slots 31 on the side walls of the outer casing 30. The inner casing 20 is pushed into the outer casing 30 to such a position where the inner ends of the sideways projections 22 of the handle side limbs 25 are brought into contact with the end walls of the guide slots 31.

The handle 21 is then rotated from the insertion position to the secured position as shown in FIGS. 4 and 5. The rotation of the handle 21 allows the inner end of the sideways projections 22 of the handle side limbs 25 to slide along the inner end wall of the guide slot 31 (that is the second inner wall 34 of the second slot 32) toward the top side of the outer casing 30 as shown in FIG. 4. The second slot 32 and the handle side limb 25 are sized so that the sliding movement of the inner end of the sideways projection 22 of the handle side limb 25 along the second inner wall 34 of the second slot 32 brings the handle side limb 25 into contact engagement with the first inner wall 33 of the second slot 32 as shown in FIG. 4. Under this condition, the handle side limb 25 serves as a lever with the contact point between the handle side limb 25 and the first inner wall 33 of the second slot 32 as the fulcrum and the handle body 24 that is held by a user's hand (not shown) as the point of application of force. With such an arrangement, the pivot of the handle side limb 25 which secures the handle side limb 25 to the inner casing 20 becomes the point of reaction where force is applied to the inner casing 20. In accordance with the principle of lever, the force applied to the inner casing 20 at the pivot is greater than the force applied to the handle body 24 by the user holding the handle 21 because the distance between the pivot and the contact point between the handle side limb 25 and the first inner wall 33 of the second slot 32 is shorter than the distance between the pivot and the handle body 24. Such a greater force is useful in driving the inner casing 20 further into the outer casing 30 in a better controlled condition and thus forcing the two connectors 23a and 23b into engagement with each other.

When the handle 21 reaches the secured position, as shown in FIG. 5, the inner casing 20 is completely and securely fixed in the outer casing 30 and the handle side limbs 25 overlap the first inner wall 33 of the second slot 32 which helps preventing the inner casing 20 from separating from the outer casing 30.

In withdrawing the inner casing 20 out of the outer casing 30, by rotating the handle 21 from the secured position (as shown in FIG. 5) toward the insertion position, the inner ends of the sideways projections 22 of the handle side limbs 25 are brought into contact with the second inner walls 34 of the second slots 32. Similarly, the handle side limbs 25 define a lever having a fulcrum at the contact point between the inner end of the sideways projection 22 and the inner side wall 34 of the second slot 32. The handle body 24 is the point of force application and the pivot that secures the handle side limb 25 to the inner casing 20 is the point of reaction. Since the distance between the fulcrum and the handle body 24 is greater than the distance between the fulcrum and the pivot so that the reaction force that acts on the inner casing 20 is greater than the force applied to the handle body 24. Thus, the inner casing 20 may be easily separated/withdrawn from the outer casing 30.

To facilitate the sliding movement of the inner end of the sideways projection 22 of the handle side limb 25 along the inner wall 33 or 34 of the second slot 32, the inner end of the sideways projection 22 is made rounded as shown in the drawings.

Although the preferred embodiment has been described to illustrate the present invention, it is apparent that changes and modifications in the specifically described embodiment can be carried out without departing from the scope of the present invention which is intended to be limited only by the appended claims.

What is claimed is:

1. A releasable closing system for a hard disk drive drawer having an outer casing configured to be fixed inside a computer and an inner casing removably received in the outer casing through a front opening in the outer casing, the outer and inner casing defining inward directions towards centers thereof and outward directions away from the centers thereof the outer casing having therein a first connector portion and the inner casing having thereon a second connector portion configured to releasably mate with the first connector portion when the inner casing is fully inserted into the outer casing, the releasable closing system comprising:

a) a substantially L-shaped channel formed in each of two opposite, inwardly facing walls of the outer casing adjacent to the front opening, the substantially L-shaped channel comprising a guide slot extending into the outer casing from the front opening to a guide slot end wall, and a second slot extending substantially perpendicular to the guide slot, the second slot having first and second facing walls, the first facing wall being coincident with the guide slot end wall;

b) a handle having a handle body interconnecting two opposite side limbs extending from the handle body, the side limbs being pivotally connected to the inner casing such that the handle is movable between an insertion position and a secured position, each side limb having an outer surface and a length greater than the combined lengths of the first facing wall and the guide slot end wall; and, c) an elongated projection connected to and extending outwardly from the outer surface of at least one side limb, the elongated projection extending longitudinally substantially parallel to a respective said side limb and having a distal end extending beyond an end of said respective side limb, the elongated projection located such that the distal end will contact the guide slot end wall before the first and second connector portions are fully engaged when the handle is in the insertion position, and, as the handle moves toward the secured position, the elongated projection contacts the second facing wall, such contact forming a fulcrum whereby the side limbs act as a lever in which a distance between the fulcrum and the handle body is greater than a distance between the fulcrum and a pivot connection pivotally connecting the side limbs to the inner casing whereby a force exerted on the inner casing by the side limbs is greater than a force exerted on the handle body to urge the first and second connector portions into full engagement.

2. The releasable closing system for a hard disk drive drawer of claim 1, wherein one of said elongated projections is connected to and extends outwardly from each side limb.

3. The releasable closing system for a hard disk drive drawer of claim 1, wherein a length of the elongated projection is not greater than combined lengths of the first facing wall and the guide slot end wall of one of the inwardly facing walls.

* * * * *